(No Model.) 2 Sheets—Sheet 2.
W. L. HORNE.
MOTOR AND VACUUM ENGINE.
No. 372,072. Patented Oct. 25, 1887.
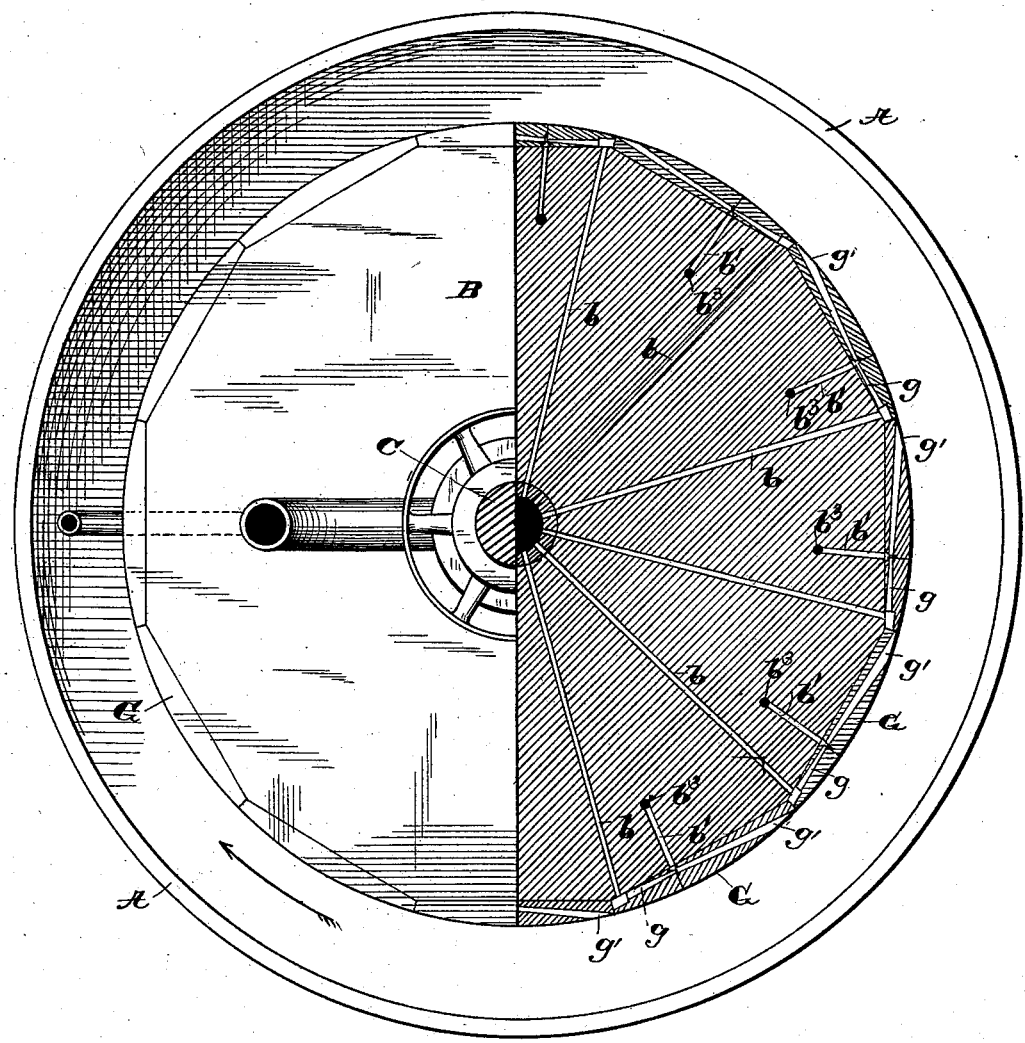
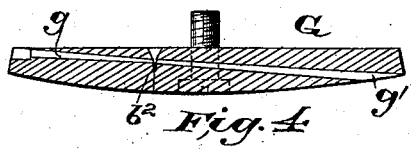
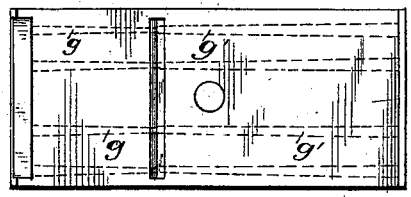

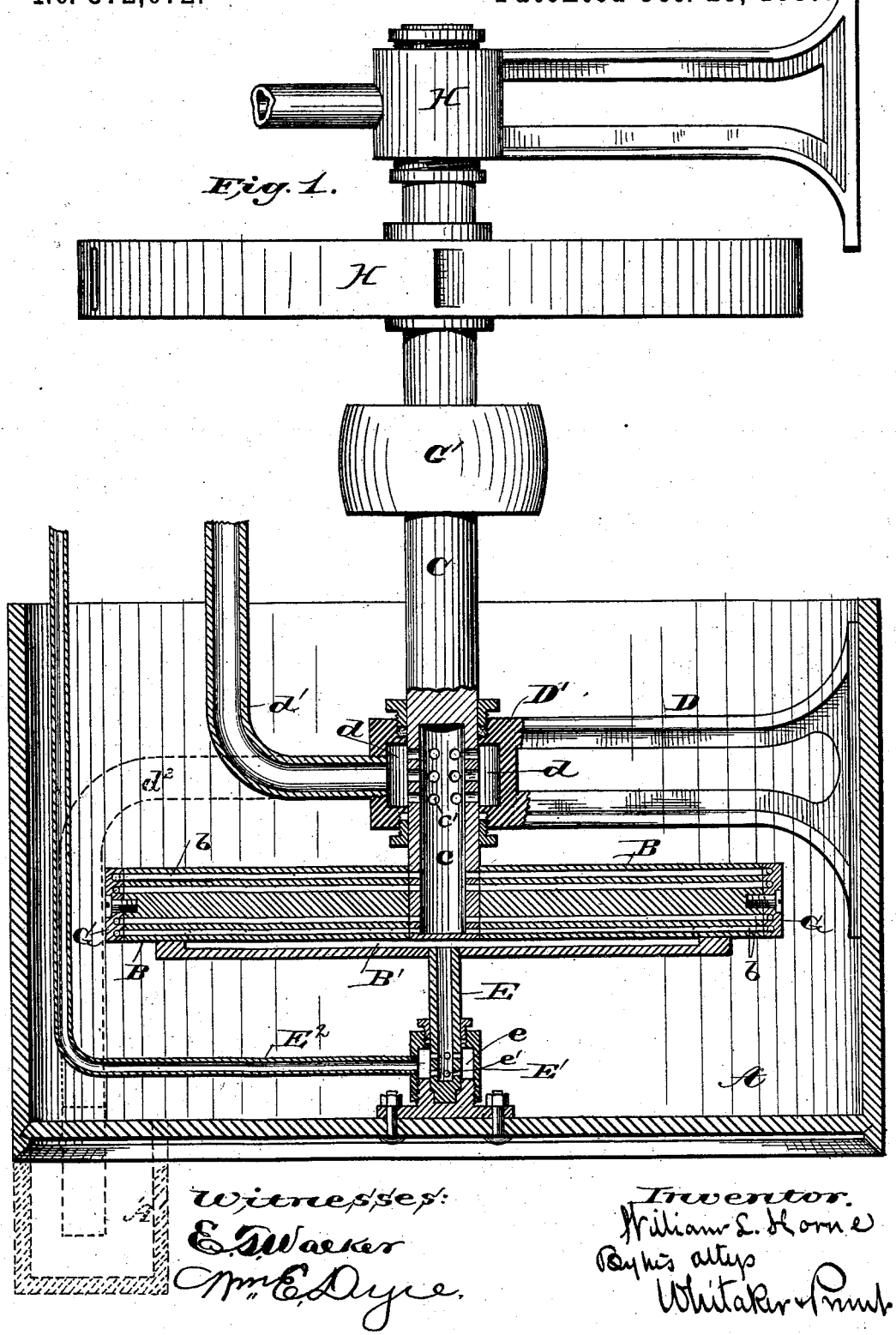

UNITED STATES PATENT OFFICE.

WILLIAM L. HORNE, OF MERIDEN, CONNECTICUT.

MOTOR AND VACUUM-ENGINE.

SPECIFICATION forming part of Letters Patent No. 372,072, dated October 25, 1887.

Application filed May 14, 1887. Serial No. 238,239. (No model.)

*To all whom it may concern:*

Be it known that I, WILLIAM L. HORNE, a citizen of the United States, residing at Meriden, in the county of New Haven and State of Connecticut, have invented certain new and useful Improvements in Motors and Vacuum-Engines; and I do hereby declare the following to be a full, clear, and exact description of the invention, such as will enable others skilled in the art to which it appertains to make and use the same.

My invention relates to that class of devices for creating a vacuum, which may be denominated "liquid-vacuum pumps;" and it consists in features of construction whereby the said pump can be employed with either a supply of liquid under pressure or with a stationary body of liquid.

In the accompanying drawings I have shown one form in which I have contemplated embodying the principles of my invention, and have set the said invention fully forth in the following description and claims.

Figure 1 is a view in elevation of a pump mechanism connected therewith, the pump being in section. Fig. 2 is a plan view of the pump, partly in section. Fig. 3 is a sectional view of one of the plates forming the periphery of the pump wheel or disk, and Fig. 4 is an interior side view of one of such plates.

In the drawings, A is a liquid-tank.

B is a disk or wheel mounted horizontally within said tank on the lower end of a shaft, C, which is supported in a bearing in a bracket, D, attached to some rigid support and extending above or within the tank. A trunnion or journal, E, extends below the disk and rotates within a stationary bearing, E', supported in any suitable manner below the disk. The bearing D' is recessed to form a space, d, about shaft C, and a pipe, d', is connected to said bearing and communicates with said space. The shaft C extends nearly through the disk, and has a passage, c, within the same. The upper end of this passage is connected by small openings c' with the space d within the bearing D'. The lower end of the passage c communicates with passages b within the disk, which extend from the shaft C to near the periphery of the disk. Within the periphery of the disk are the tangential passages g g', the former of which communicates with the passages b of the disk. These passages g have a slightly-decreasing taper from the passages b to their junction with the passages g', so that they are slightly smaller at the point of meeting with the passages g' than they are at their point of junction with the passages b. The passages g' are nearest the passages g, slightly larger than the passages g, and have a slightly-increasing taper to the periphery of the disk. Between the two passages g and g' is a narrow space, $b^2$, of greater area than the diameter of the passages, and this space communicates with passages b' within the disk. The passages g g' form one continuous passage having only the interruption of the narrow space, and said passages with b form a single passage for the discharge of liquid at the periphery of the disk from the central supply.

The bearing E' below the disk B is recessed to form the space e, and a pipe, $E^2$, communicates with this space. The shaft E has a passage through the same, and this passage communicates, by small openings e', with the space e. This passage at its other end communicates with a space, B', within the disk, and which may be of circular or star shape. The outwardly-extending portions of this space are connected with passages b' within the disk by vertical passages $b^3$.

Where this device is to be used in connection with a supply of liquid under pressure, the pipe d' is connected with such liquid-supply, and the pipe $E^2$ is connected with the vessel from which the air is to be exhausted. On admitting the liquid to the pipe d', it flows through space d, shaft C, passages b, g, and g', discharging at the periphery of the disk. The liquid passing through the space $b^2$ withdraws the air therefrom and through passages $b^3$, space B', slot E, space e, and pipe $E^2$ from the required vessel until a vacuum is established in said passages and vessel. The discharge of the liquid from the periphery of the disk gives motion thereto, which can be utilized in any desired way, the shaft C being provided with a band-pulley, C', from which motion can be communicated to the place or mechanism desired.

In case it is desired to use the device to form a vacuum under circumstances in which a supply of liquid under pressure is not obtainable, the pipe d' is replaced by a pipe, $d^2$, extending to near the bottom of tank A'. The tank A' is then filled or nearly filled with liquid and power applied to shaft C by means of the band-pulley C', or in any desired manner, and the disk rotated in the direction of the arrow in Fig. 2. This will cause the liquid in the tank to be drawn into the disk through the pipe $d^2$ and discharged from the periphery, producing the same result as before indicated.

In the drawings I have shown, as a means of giving motion to shaft C, the rotary motor H mounted on said shaft. When this construction is employed, a bearing, H', above the motor is essential; but I prefer in all cases to provide a bearing for shaft C above bearing D to secure steadiness.

I prefer to form the periphery of disk B of detachable sections G, as shown in Figs. 2, 3, &c., and to form the passages $g\,g'$ and spaces $b^2$ therein; but the said passages may be made in the edge of the disk when so desired.

I have shown in the drawings four passages in one vertical line, connecting the shaft C with the periphery, and four passages, $g\,g'$, connecting therewith. I may, however, employ but one passage, $b$, at any single point to connect the shaft C with one or more passages, $g\,g'$, in the periphery of the disk, and may employ a greater or less number of passages, $g\,g'$, than I have shown in the drawings.

The passages $b^3$ and $b'$ may be connected with the passages $b$ in the same way in which they are connected with the passages $g\,g'$ when that construction is preferred.

In using my construction the passages $b$ should extend to the periphery of the disk, and to secure the best results the outer portion of said passage should have a construction similar to that of passage $g\,g'$.

I have also contemplated providing the tank A with a depending recess or well, A', (shown in dotted lines in Fig. 1,) and extending the pipe $d^2$ down into the same in order to more perfectly insure the use of liquid unaffected by the air forced from the disk.

Although I prefer to use the tank A, the same is not a necessary part of my invention, as any vessel capable of holding liquid may be substituted for it, and when the device is connected with a liquid-pressure supply it may be dispensed with.

It will be understood that instead of the disk I may employ tubular arms of the form of the passages within the same and employ tubes in the place of the space B'; but I prefer the disk construction.

What I claim, and desire to secure by Letters Patent, is—

1. A vacuum-pump consisting of a revoluble body having a central liquid-supply, a lateral passage communicating at one end with the central liquid-supply and having a discharge at its other end, and an air-passage communicating with said lateral passage between the inlet-point and the point of discharge, substantially as described.

2. A vacuum-pump consisting of a revoluble disk having liquid-passages discharging at its periphery and an air passage or passages communicating with the said liquid-passages between the inlet-points and the discharge-points of the same, and a central liquid-supply communicating with the passages discharging at the periphery of the disk, substantially as described.

3. The combination, with a revoluble disk having liquid-passages discharging at its periphery, said passages consisting of two parts of slightly different diameters having a narrow space of greater diameter than said passages between the two, of an air passage or passages communicating with said narrow space, and a central liquid-supply communicating with the peripheral passages, substantially as described.

4. The combination, with a revoluble disk having a central liquid-supply and tangential discharge-passages communicating therewith, of an air passage or passages communicating with said tangential discharge-passages between the central liquid-supply and the discharge-points of such passages, substantially as described.

5. A vacuum-pump consisting of a shaft having a passage within the same, a trunnion or journal having a passage within it in line with the passage within the shaft, but disconnected therefrom, a liquid-supply pipe in connection with the passage within the shaft, and liquid-passages extending laterally from the shaft communicating with the shaft-passage, and an air-pipe communicating with the passage in the trunnion, the said trunnion-passage being in communication with each of the lateral liquid-passages between the inlet and outlet ends of said passages, substantially as described.

6. The herein-described vacuum pump, consisting of the combination, with a shaft having a passage therein forming a liquid-supply passage, of a disk mounted on said shaft provided with liquid-passages extending from the liquid-passage within the shaft to the periphery of the disk, air-passages communicating with the liquid-passages between inlet and discharge ends of said passages, and an axial passage separate from the liquid-passage, but communicating with the air-passages.

7. The combination, with a liquid-tank, of a shaft having a passage within the same extending within the said tank, a liquid-supply pipe communicating with said passage within the shaft, liquid-passages communicating with the shaft-passage and extending laterally therefrom, air-passages communicating with the lateral liquid-passages, an axial air-passage disconnected from the liquid-passage of the shaft, but communicating with the air-passages, and a connection with the axial air-passage extending without the receptacle, substantially as described.

In testimony whereof I affix my signature in presence of two witnesses.

WM. L. HORNE.

Witnesses:
E. T. WALKER,
G. H. WHITAKER.